US010650399B2

(12) United States Patent
Kalin

(10) Patent No.: US 10,650,399 B2
(45) Date of Patent: May 12, 2020

(54) SYSTEMS AND METHODS FOR SHOPPING IN AN ELECTRONIC COMMERCE ENVIRONMENT

(75) Inventor: Robert Kalin, Brooklyn, NY (US)

(73) Assignee: Etsy, Inc., Brooklyn, NY (US)

( * ) Notice: Subject to any disclaimer, the term of this patent is extended or adjusted under 35 U.S.C. 154(b) by 1024 days.

(21) Appl. No.: 13/015,622

(22) Filed: Jan. 28, 2011

(65) Prior Publication Data

US 2012/0197700 A1   Aug. 2, 2012

(51) Int. Cl.
*G06Q 30/02*  (2012.01)
*G06Q 30/06*  (2012.01)

(52) U.S. Cl.
CPC ..... *G06Q 30/0222* (2013.01); *G06Q 30/0633* (2013.01)

(58) Field of Classification Search
CPC .............. G06Q 30/0222; G06Q 30/0633
See application file for complete search history.

(56) References Cited

U.S. PATENT DOCUMENTS

| 6,321,211 | B1 | 11/2001 | Dodd |
| 6,850,917 | B1 | 2/2005 | Hom et al. |
| 7,660,746 | B1 | 2/2010 | Song |
| 7,720,723 | B2 | 5/2010 | Dicker et al. |
| 7,792,699 | B2 | 9/2010 | Kwei |
| 7,970,661 | B1* | 6/2011 | Abraham et al. ............ 705/26.1 |
| 8,170,919 | B2* | 5/2012 | Barbour et al. ............ 705/26.1 |
| 8,244,598 | B2 | 8/2012 | Jacobi et al. |
| 2002/0178072 | A1 | 11/2002 | Gusler et al. |
| 2004/0107190 | A1 | 6/2004 | Gilmour et al. |
| 2005/0075926 | A1 | 4/2005 | Liu et al. |
| 2005/0096997 | A1 | 5/2005 | Jain et al. |
| 2007/0156530 | A1 | 7/2007 | Schmitt et al. |
| 2007/0208627 | A1 | 9/2007 | Abadi |
| 2007/0219874 | A1 | 9/2007 | Toulotte |
| 2007/0282915 | A1 | 12/2007 | Vosshall et al. |
| 2008/0208705 | A1 | 8/2008 | Kern et al. |
| 2009/0043674 | A1* | 2/2009 | Minsky et al. ............... 705/27 |
| 2009/0254447 | A1 | 10/2009 | Blades |

(Continued)

FOREIGN PATENT DOCUMENTS

WO    2001029787 A2    4/2001

OTHER PUBLICATIONS

Notification of Transmittal of the International Search Report and the Written Opinion of the International Searching Authority, or the Declaration, dated May 29, 2012, in International Application No. PCT/US2012/022950, filed Jan. 27, 2012, 7 pages.

(Continued)

*Primary Examiner* — Colleen A Hoar
(74) *Attorney, Agent, or Firm* — Fish & Richardson P.C.

(57) ABSTRACT

A method of shopping within an electronic commerce environment includes enabling a first user of a plurality of users to add one or more items to a virtual shopping cart of the first user that is maintained by a server computer system, generating, by the server computer system, statistical data related to the one or more items, and providing the statistical data to the first user in a web page that is generated by the server computer system. The statistical data includes a total quantity of at least one of the one or more items that are contained in the virtual shopping carts of all of the plurality of users.

21 Claims, 12 Drawing Sheets

(56) References Cited

U.S. PATENT DOCUMENTS

| | | |
|---|---|---|
| 2009/0276284 A1 | 11/2009 | Yost |
| 2010/0030578 A1* | 2/2010 | Siddique et al. ............... 705/3 |
| 2010/0042515 A1 | 2/2010 | Crespo et al. |
| 2010/0100416 A1 | 4/2010 | Herbrich et al. |
| 2010/0169160 A1 | 7/2010 | Wu et al. |
| 2010/0191619 A1 | 7/2010 | Dicker et al. |
| 2011/0004509 A1 | 1/2011 | Wu et al. |
| 2011/0004533 A1* | 1/2011 | Soto et al. ............... 705/27.1 |
| 2011/0010266 A1 | 1/2011 | Edwards |
| 2011/0016014 A1 | 1/2011 | Tonnison et al. |
| 2011/0137749 A1 | 6/2011 | Kwei |
| 2012/0173333 A1 | 7/2012 | Berger |
| 2013/0066750 A1 | 3/2013 | Siddique et al. |

OTHER PUBLICATIONS

Non-Final Office Action dated Aug. 30, 2012, in U.S. Appl. No. 13/015,623, filed Jan. 28, 2011, 47 pages.

Notification of Transmittal of the International Search report and the Written Opinion of the International Search Authority, or the Declaration, dated Jun. 7, 2012, in International Application No. PCT/US2012/022948, filed Jan. 27, 2012, 49 pages.

Notification of Transmittal of the International Seach Report and the Written Opinion of the International Searching Authority, or the Declaration, dated Jun. 7, 2012, for International Application No. PCT/US2012/022954, filed Jan. 27, 2012, 89 pages.

Schafer et al., "E-Commerce Recommendation Appications", Data Mining and Knowledge Discovery, Kluwer Academic Publishers (2001) <URL: http://ceit.aut.ac.ir/~sa_hashemi/My%20Research/0-Selected%20Papers/2-ECommerce%20Systems/ECommerce%20Recommendation%20fulltext.pdf>.

* cited by examiner

Contribution setup for Shared CartA

Recipient of Shared CartA

Full Name: FriendN

Country: United States

Street: 123 Friend Street

City: Friendville

State: New York

Zip/Postal Code: 11217

Contents and cost of Shared Cart A iPad docking station

| Price | Shipping | Quantity |
|---|---|---|
| $25.00 | $0.50 USD | 1 |

Who can contribute

Open to: ⦿ Everyone ○ Invite Only

Your initial contribution

Amount in $ USD    10.00

Message

Include a message: ⦿ Yes ○ No

Send to: UsernameD add another friend

Subject: UsernameA just contributed to a cart

Link: www.etsy.com/myUserName/share/CartA

Message (optional): Check out shared CartA
I just chipped in $10 towards item A
for FriendN
Yay!

Submit

*FIG. 6*

SYSTEMS AND METHODS FOR SHOPPING IN AN ELECTRONIC COMMERCE ENVIRONMENT

CROSS-REFERENCE TO RELATED APPLICATIONS

This application is related to co-pending U.S. application Ser. No. 13/015,621, entitled "SYSTEMS AND METHODS FOR SHOPPING IN AN ELECTRONIC COMMERCE ENVIRONMENT," and filed on Jan. 28, 2011, which is herein incorporated by reference in its entirety.

This application is further related to co-pending U.S. application Ser. No. 13/015,623, entitled "SYSTEMS AND METHODS FOR SHOPPING IN AN ELECTRONIC COMMERCE ENVIRONMENT," and filed on Jan. 28, 2011, which is herein incorporated by reference in its entirety.

BACKGROUND OF THE INVENTION

1. Field of Invention

Embodiments of the present invention relate generally to electronic commerce, and more specifically, to virtual shopping carts within an electronic commerce environment.

2. Discussion of Related Art

A virtual shopping cart, or virtual shopping basket, is a metaphor used within an electronic commerce (hereinafter "e-commerce") environment to describe a mechanism and/or process of selecting items within an online marketplace for prospective purchase. Typically, a customer visiting an e-commerce website will locate and choose one or more items that she wishes to purchase by placing representations of them into the virtual shopping cart. The actual items may be, for example, real goods (e.g., an article of clothing), virtual goods (e.g., a subscription to an online magazine), or services (e.g., an airline ticket). Any of the items that are selected by the customer may be contained indefinitely in the shopping cart until the customer is ready to complete an order for them (sometimes referred to as "checkout"). For instance, the customer may purchase the items immediately, or leave the website and return at a later time to add items to the shopping cart, remove items from the shopping cart, and/or purchase the items that are contained in the shopping cart.

BRIEF SUMMARY OF THE INVENTION

Various embodiments of the present disclosure are directed to systems and methods for shopping in an electronic commerce environment, in particular, through an e-commerce website. One aspect of the disclosure provides users of the e-commerce website with the ability to create a virtual shopping cart containing one or more items, and to share access to the cart with one or more other users. Users having access to the shared cart may purchase items in the cart or contribute funds toward the purchase of the items (e.g., a "shared" purchase). Items in the shared cart may be modified (e.g., quantity, color, material, shipping address, among other item characteristics) or removed from the cart by one or more users. For example, a first user may contribute funds toward a portion of the total cost of an item in the cart, and a second user may contribute additional funds towards the remaining amount. The item is purchased once enough funds have been contributed, by any number of users, to cover to total cost.

According to another aspect, users having access to the shared cart may share views of an item in the cart with other people, for example, by e-mailing a link to the item, or by sharing a view of the item on a social network website. In one embodiment, users may add comments, rankings or ratings to the items in the cart, which may be viewed by other users having access to the shared cart. In another embodiment, the shared cart may be converted into a curated listing of items.

According to another aspect, a user may make an initial contribution toward purchasing an item in the virtual shopping cart, and invite others to contribute to and/or purchase the item. Thus, no one person would pay the total price for the item. The item may be purchased for a specified recipient once enough funds have been contributed toward the total price.

According to yet another aspect, the e-commerce website may provide statistics with respect to virtual shopping carts. In one embodiment, a user may see if a selected item on the e-commerce website has been added to another user's virtual shopping cart. For example, "this item is in 3 other shopping carts." This information may be combined with inventory information (e.g., how many units of the item are available for sale). The statistical information may be provided textually or graphically, such as in a chart, map, or other illustrative device. The statistical information provides users with the ability to, for example, gauge interest in a particular item, or as a marketing or motivational selling tool.

According to another aspect, the e-commerce website may provide sellers with tools for communicating with prospective buyers who have added the seller's item(s) to their virtual shopping carts. For example, the seller could use the tools to send marketing messages (e.g., promotional offers) to the prospective buyers. Further, the e-commerce website may assign a point value or other metric to each of the prospective buyers, for example, to enable sellers to identify most likely buyers and direct communications to those people.

Several embodiments of the present disclosure will now be described.

According to one embodiment of the present disclosure, a method of shopping within an electronic commerce environment includes enabling a first user to add one or more items to a virtual shopping cart using a first user interface that is generated by a server computer system, enabling the first user to enter into a commitment to contribute funds toward a purchase, by a second user, of at least one of the items in the virtual shopping cart using a second user interface that is generated by the server computer system, and enabling the second user to purchase the items by exercising the commitment of the first user. The first user may share access to the virtual shopping cart with the second user. The second user may access the virtual shopping cart subsequent to the first user sharing access to the virtual shopping cart with the second user.

According to another embodiment, the contents of the virtual shopping cart may include the items. The second user may modify the contents of the virtual shopping cart using a third user interface that is generated by the server computer system. The first user and/or the second user may be provided with information related to the commitment of the first user through a third user interface that is generated by the server computer system. The information may include an identity of the first user, a first fund amount representing the commitment of the first user, a second fund amount representing a difference between at least a price of items and the first fund amount, or any combination of this information.

In another embodiment, the commitment to contribute funds may include an initial contribution amount. A third user may enter into a commitment to contribute additional funds toward the purchase, by the second user, of the items in the virtual shopping cart using a third user interface that is generated by a server computer system. The second user may purchase the items by exercising the commitment of the third user. The third user may be authorized by the first user to enter into the commitment to contribute additional funds.

According to yet another embodiment, the first user may compose an electronic message to be transmitted to the second user in conjunction with entering into the commitment of the first user.

According to one embodiment, an electronic commerce system includes a server computer system having at least one processor that is configured to execute a plurality of processes. The processes include enabling a first user to create a virtual shopping cart containing one or more items, enabling the first user to enter into a commitment to contribute funds toward a purchase, by a second user, of at least one of the items contained in the virtual shopping cart, and enabling the second user to purchase the items contained in the virtual shopping cart by exercising the commitment of the first user. The processes may further include enabling the first user to share access to the virtual shopping cart with the second user. The virtual shopping cart may be accessible by at least one user other than the first user.

In another embodiment, the processes may further include enabling a third user to enter into a commitment to contribute additional funds toward the purchase, by the second user, of the items contained in the virtual shopping cart. The processes may further include enabling the second user to purchase the items contained in the virtual shopping cart by exercising the commitment of the third user. The processes may further include enabling the first user to compose an electronic message to be transmitted to the second user. The processes may further include enabling the first user to transfer control of the virtual shopping cart to the second user.

According to yet another embodiment, the processes may further include enabling the first user to convert the virtual shopping cart into a curated list of the one or more items contained in the virtual shopping cart. The curated list may be accessible by at least one user other than the first user.

In another embodiment, the processes may further include enabling the first user and/or the second user to enter a comment and/or a rating to be associated with the virtual shopping cart and/or the items contained in the virtual shopping cart. The comment and/or the rating may be viewable by at least one user other than the first user and the second user.

The processes may further include providing, to the first user and/or the second user, information related to the virtual shopping cart. The information related to the virtual shopping cart may include an identity of the first user, a first fund amount representing the commitment of the first user, a second fund amount representing a difference between at least a price of the at least one of the one or more items contained in the virtual shopping cart and the first fund amount, or any combination of information.

According to one embodiment, a method of shopping within an electronic commerce environment includes providing for a first user to select, within a user interface operating on a client computing system connected to an electronic commerce system over a computing network, at least one action from a plurality of actions. The action is to be performed on a virtual shopping cart, and the virtual shopping cart is configured to contain one or more items selected by at least the first user from a plurality of items listed in a database maintained by the electronic commerce system. The method further includes performing, by the electronic commerce system, the action in response to the first user selecting the action from the plurality of actions. The plurality of actions includes: send a virtual shopping cart message to a second user; share access to the virtual shopping cart with the second user; contribute funds toward purchasing at least one of the one or more items contained by the virtual shipping cart; add a comment to the virtual shopping cart; add a comment to at least one of the one or more items; add a rating to the virtual shopping cart; add a rating to at least one of the one or more items; and transfer control of the virtual shopping cart to the second user. The plurality of actions may further include: convert the virtual shopping cart to a curated list of items, and make the virtual shopping cart public.

If the action selected by the first user is send a virtual shopping cart message, performing the at least one action may include transmitting an electronic message to an electronic address associated with the second user. The electronic message may include a virtual link to the virtual shopping cart. The virtual link may be a Hypertext Transfer Protocol (HTTP) request message configured to request access, using a web browser, to the virtual shopping cart through the electronic commerce system.

In another embodiment, if the action selected by the first user is 'share access to the virtual shopping cart with the second user,' performing the action may include providing for the second user to view the virtual shopping cart, modify the virtual shopping cart, and/or purchase at least one of the one or more items contained by the virtual shopping cart. If the action selected by the first user is 'contribute funds toward purchasing at least one of the one or more items contained by the virtual shopping cart,' performing the action may include enabling the first user to enter into a commitment to contribute funds toward the purchase of the items contained by the virtual shopping cart.

According to one embodiment, a method of shopping within an electronic commerce environment includes enabling a first user of a plurality of users to add an item to a virtual shopping cart using a first user interface that is generated by a server computer system, enabling each of the users to enter into a commitment to contribute funds toward a purchase of the item in the virtual shopping cart using a second user interface that is generated by the server computer system, and causing the item to be purchased if a combination of the funds of the commitments of each of the users is sufficient to purchase the item. The first user may share access to the virtual shopping cart with each of the users. Each of the users may access the virtual shopping cart subsequent to the first user sharing access to the virtual shopping cart with each of the users.

According to one embodiment, a method of shopping within an electronic commerce environment includes enabling a first user of a plurality of users to add one or more items to a virtual shopping cart of the first user that is maintained by a server computer system, generating, by the server computer system, statistical data related to the items, and providing the statistical data to the first user in a web page that is generated by the server computer system. The statistical data includes a total quantity of at least one of the items that are contained in the virtual shopping carts of all of the users.

In another embodiment, the statistical data may include a location of each of the plurality of users having the at least one of the one or more items in their virtual shopping carts. The location may be graphically represented on a map that is generated by the server computer system and presented to the first user in the web page. The statistical data may include a quantity of each of the one or more items which are available for purchase. The statistical data may include a date on which the at least one of one or more items was added to the virtual shopping cart of any of the users.

According to yet another embodiment, a seller of at least one of the items may be enabled to send a sales incentive to the first user. Sending the sales incentive to the first user may consume a pre-determined number of points that are allocated to the seller. The pre-determined number of points may be based on a characteristic of the seller, the first user and/or the statistical data. The characteristic of the first user may include a purchase history of the first user, a location of the first user, a length of time that the first user has been a member of the electronic commerce environment, and/or the one or more items in the virtual shopping cart of the first user. The characteristic of the seller may include a sales volume of the seller within the electronic commerce environment, a sales history of the seller, and/or a length of time that the seller has been a member of the electronic commerce environment. In one embodiment, the sales incentive may include a price discount offer, a shipping cost discount offer, a free item offer, a free shipping offer, a two-for-one offer, and/or a credit offer.

According to one embodiment, an electronic commerce system includes a virtual shopping cart component configured to enable a first user of a plurality of users to add one or more items to a virtual shopping cart of the first user, and a statistical data component. The statistical data component is configured to generate statistical data related to the one or more items, and provide the statistical data to the first user in a web page that is generated by the electronic commerce system. The statistical data includes a total quantity of at least one of the one or more items that are contained in the virtual shopping carts of all of the users. The statistical data may include a location of each of the plurality of users having the at least one of the one or more items in their virtual shopping carts. The location may be graphically represented on a map that is presented to the first user in the web page. The statistical data may include a quantity of each of the one or more items which are available for purchase. The statistical data may include a date on which the at least one of one or more items was added to the virtual shopping cart of any of the plurality of users.

According to another embodiment the statistical data component may be configured to enable a seller of the at least one of the one or more items to send a sales incentive to the first user. Sending the sales incentive to the first user may consume a pre-determined number of points that are allocated to the seller. The pre-determined number of points may be based on a characteristic of the seller, the first user and/or the statistical data. The characteristic of the first user may include a purchase history of the first user, a location of the first user, a length of time that the first user has been a member of the electronic commerce environment, and/or the items in the virtual shopping cart of the first user. The characteristic of the seller may include a sales volume of the seller within the electronic commerce environment, a sales history of the seller, and/or a length of time that the seller has been a member of the electronic commerce environment. The sales incentive may include a price discount offer, a shipping cost discount offer, a free item offer, a free shipping offer, a two-for-one offer, and/or a credit offer.

Further embodiments related to the present disclosure will now be described.

According to one related embodiment, a method of shopping within an electronic commerce environment includes providing first, second and third user interfaces generated by a server computer system, enabling a user of an electronic commerce website to select an item for sale using the first user interface, providing, to the user, a suggestion for a recipient for the selected item based on a relationship between the user and the suggested recipient, enabling the user to designate the suggested recipient as a prospective recipient of the selected item using the second user interface, and enabling the user to contribute funds toward a purchase of the selected item using the third user interface wherein the selected item is to be shipped to the prospective recipient subsequent to the purchase. The relationship is to be identified using characterization information associated with the user and stored in a database on the server computer system.

In another embodiment, the method may further include an act of enabling the user to invite at least one other user to contribute funds toward the purchase of the selected item using a fourth user interface to be provided by the server computer system. In yet another embodiment, the method may further include an act of sending a message to the at least one other user for inviting the at least one other user to contribute funds toward the purchase of the selected item using a fourth user interface to be provided by the server computer system. In yet another embodiment, the method may further include an act of enabling the at least one other user to contribute funds toward the purchase of the selected item using a fourth user interface to be provided by the server computer system. In another embodiment, the purchase may occur when a total of the contributed funds is sufficient to purchase the selected item.

In another embodiment, the method may further include an act of enabling the at least one other user to invite at least one additional user to contribute funds toward the purchase of the selected item using a fourth user interface to be provided by the server computer system. In yet another embodiment, the method may further include an act of enabling the at least one additional user to contribute funds toward the purchase of the selected item using a fourth user interface to be provided by the server computer system.

In various embodiments, the suggested recipient may be a family member of the user, a friend of the user, a friend-of-a-friend of the user, a person from whom the user has previously purchased a commodity, a person to whom the user has previously sold a commodity, a person who designed a commodity purchased by the user, and/or a person who purchased a commodity designed by the user.

In another embodiment, the act of suggesting may further include determining a confidence level associated with the suggested recipient based on a characteristic of the suggested recipient, and wherein the act of suggesting is further based on the confidence level. In yet another embodiment, the characteristic of the suggested recipient may include at least one of favorite items of the suggested recipient and items purchased by the suggested recipient. In yet another embodiment, the act of suggesting may further include an act of ranking the suggested recipient based on the confidence level. In yet another embodiment, the act of suggesting may further include an act of ranking the suggested recipient based on the relationship. In one embodiment, a ranking of the suggested recipient may correspond to a degree of separation between the user and the suggested recipient, wherein the degree of separation accords to one of a familial relationship, a friendship, and an indirect relationship.

According to one embodiment related to the present disclosure, an electronic commerce system includes a virtual shopping cart component configured to enable a user to select an item for sale using a first user interface to be provided by a server computer system, and a recipient configuration component. The recipient configuration component is configured to suggest, to the user, a recipient for the selected item based on a relationship between the user and the suggested recipient, enable the user to designate the suggested recipient as a prospective recipient of the selected item using a second user interface to be provided by the server computer system, and enable the user to contribute funds toward a purchase of the selected item using a third user interface to be provided by the server computer system. The relationship is to be identified using characterization information associated with the user and stored in a database to be provided by the server computer system. The selected item is to be shipped to the prospective recipient subsequent to the purchase.

In another embodiment, the recipient configuration component may be further configured to enable the user to invite at least one other user to contribute funds toward the purchase of the selected item using a fourth user interface to be provided by the server computer system. In yet another embodiment, the recipient configuration component may be further configured to send a message to the at least one other user for inviting the at least one other user to contribute funds toward the purchase of the selected item using a fourth user interface to be provided by the server computer system. In yet another embodiment, the recipient configuration component may be further configured to enable the at least one other user to contribute funds toward the purchase of the selected item using a fourth user interface to be provided by the server computer system. In one embodiment, the purchase may occur when a total of the contributed funds is sufficient to purchase the selected item. In another embodiment, the recipient configuration component may be further configured to enable the at least one other user to invite at least one additional user to contribute funds toward the purchase of the selected item. In yet another embodiment, the recipient configuration component may be further configured to enable the at least one additional user to contribute funds toward the purchase of the selected item using a fourth user interface to be provided by the server computer system.

According to one embodiment related to the present disclosure, a computer readable readable medium includes computer-executable instructions stored thereon for shopping within an electronic commerce website. The computer-executable instructions, when executed by a computer, cause the computer to perform a method including acts of enabling a user of an electronic commerce website to select an item for sale using a first user interface to be provided by a server computer system, suggesting, to the user, a recipient for the selected item based on a relationship between the user and the suggested recipient, enabling the user to designate the suggested recipient as a prospective recipient of the selected item using a second user interface to be provided by the server computer system, and enabling the user to contribute funds toward a purchase of the selected item using a third user interface to be provided by the server computer system. The relationship is to be identified using characterization information associated with the user and stored in a database to be provided by the server computer system. The selected item is to be shipped to the prospective recipient subsequent to the purchase.

In another embodiment, the method may further comprises acts of generating, by the server computer system, statistical data related to the item, the statistical data including a total quantity of the item that is contained in a plurality of virtual shopping carts of a plurality of users, and providing the statistical data to the first user in a fourth user interface to be provided by the server computer system.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 6 illustrates the virtual shopping cart webpage of FIG. 2 having a contribution configuration dialog box;

DETAILED DESCRIPTION OF THE INVENTION

Figure 1:
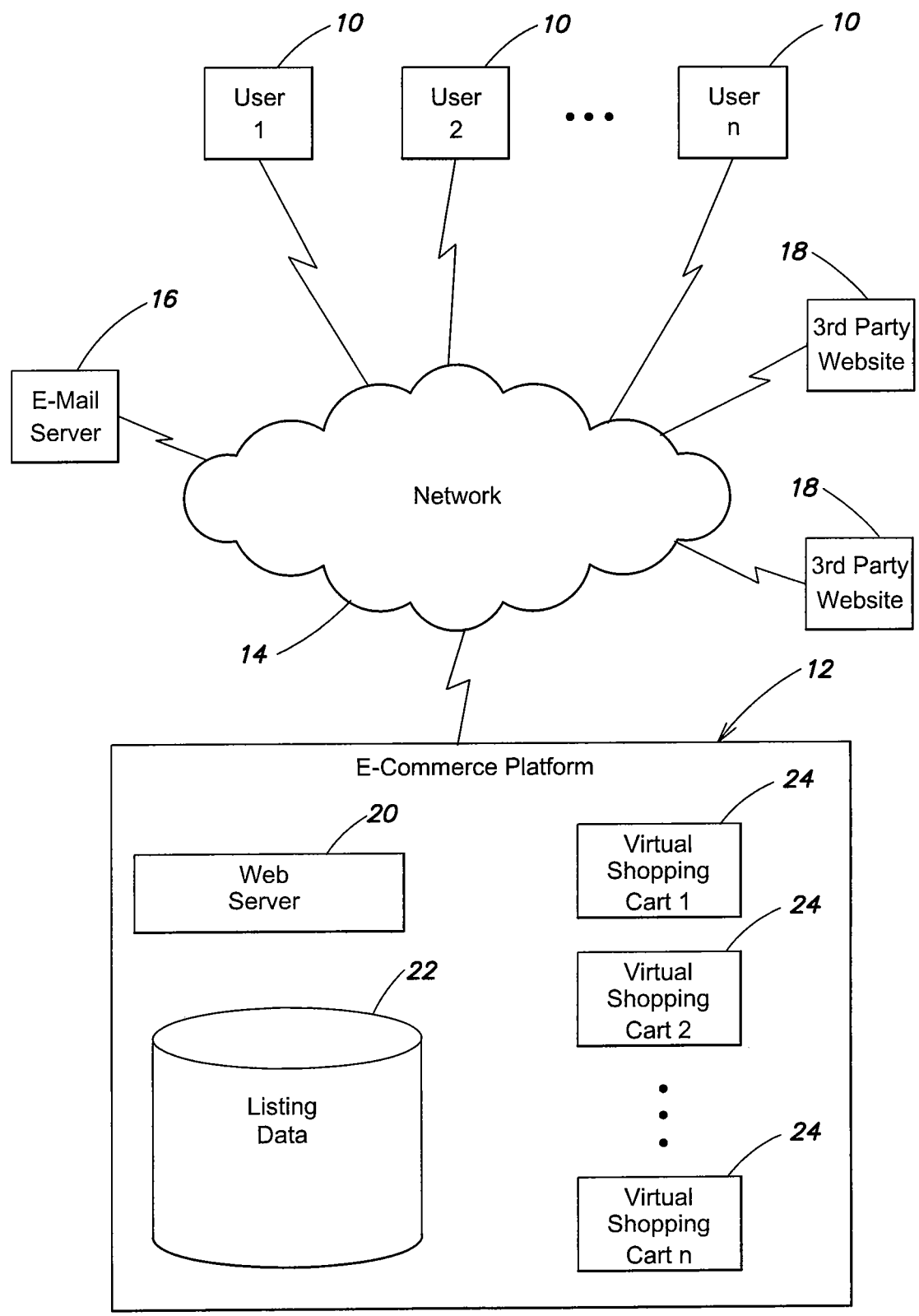
FIG. 1 is a block diagram of an e-commerce system in accordance with one embodiment of the present invention.

Embodiments of the invention are not limited in their application to the details of construction and the arrangement of components set forth in the following description or illustrated in the drawings. Embodiments of the invention are capable of other embodiments and of being practiced or of being carried out in various ways. Also, the phraseology and terminology used herein is for the purpose of description and should not be regarded as limiting. The use of "including," "comprising," "having," "containing," "involving,"

and variations thereof herein is meant to encompass the items listed thereafter and equivalents thereof as well as additional items.

Embodiments of the present disclosure provide systems and methods for shopping within an e-commerce environment that is provided by an e-commerce platform. The e-commerce environment supports an online marketplace where goods, services, and other articles of commerce can be bought and sold over the Internet or other computer networks, such as through websites designed for these purposes. The goods and services may be physical and tangible, or virtual (e.g., privileges for accessing restricted content on a website, discount offers, or other non-physical goods). The e-commerce platform may be tailored to serve particular purposes, such as business-to-business commerce (e.g., wholesale), business-to-consumer commerce (e.g., on-line retail), private sales, auctions, or individual store fronts, and may even be further specialized to support a particular marketplace (e.g., for clothing, housewares, artwork, and so forth). The e-commerce platform may also provide features that facilitate activity within the marketplace, such as search engines, social media (e.g., on-line forums, blogs, social networks, shared photo and video albums, wilds, netmeetings, and virtual entertainment), financing and payment tools (e.g., banking, fund transfer, credit services), shipping and freight services, and so on. Further, the e-commerce platform may be backed by so-called "brick-and-mortar" facilities, such as retail stores, distribution warehouses, and the like. In another example, the platform may merely be an electronic facilitator of trading markets between independent individuals and businesses.

Shared Shopping Carts

According to one aspect of the present invention, an e-commerce website, which is supported by the e-commerce platform, hosts listings for large numbers of saleable items. It should be understood that, as used herein, an "item" refers to a good, a service, an article of commerce, or any combination thereof. According to various embodiments of the invention, the systems and methods disclosed herein provide virtual shopping carts for selecting and purchasing items listed at the e-commerce website, as well as for items that are sold or traded through channels other than the website.

For example, a user of a conventional e-commerce website may browse an item listing online and select one or more of those items, which are then placed into a conventional virtual shopping cart. Once items are added, the virtual shopping cart is usually only accessible to the user, although in some instances the shopping cart may be viewable or modifiable by others, usually only at the user's request. It is appreciated that conventional methods of shopping cart purchasing include the limitation that only one user, who may be the customer or another user having appropriate access, can pay for the items in the cart. Therefore, according to one aspect, it is appreciated that it may be desirable to provide multiple users with access to the shopping cart, and the items therein, by sharing the cart with one or more other people (e.g., other users of the website).

In one embodiment, a virtual shopping cart may be created when a user selects one or more items for prospective purchase. The e-commerce platform includes software that stores the selected items in the shopping cart (e.g., within a database on a server) for an indefinite period of time. For example, the items may be stored in the shopping cart until the user removes them from the cart or completes an order for them (i.e., purchases the items). According to one embodiment, the shopping cart may exist independently of an interactive user session at the website such that the items remain the cart after the user exits, or logs out of, the website. This allows the user who created the cart to return at a later time and review the contents of the cart, add items to or remove items from the cart, or purchase any of the items in the cart. Further, the e-commerce website may permit other users to review and/or modify contents in the cart.

FIG. 1 illustrates a block diagram of an e-commerce system in accordance with one embodiment of the present invention. One or more users 10, each using a client computing system (not shown), connect with an e-commerce platform 12 through a network 14, such as the Internet or other wide area network. One or more e-mail servers 16, third party websites 18, or combinations of these may, optionally, connect with e-commerce platform 12. E-commerce platform 12 includes a web server 20 and a listing database 22, and is configured to maintain one or more virtual shopping carts 24. Listing database 22 may include, among other things, listing data associated with each of a plurality of items listed within the e-commerce system. For example, the listing data may include a name or title for each item that is listed for sale, a description of the item (or other visual representation), information about purchasing the item, and other information. Each user 10, who may be, for example, a buyer, seller, or other individual or entity, uses the client computing system to interact with e-commerce platform 12.

As will be described in further detail below, each virtual shopping cart 24 represents a collection of one or more items that are selected by each user 10 from the list of items for prospective purchase. Virtual shopping cart 24, and the items contained therein, are accessible by user 10 who initially selected the items. User 10 may view the contents of virtual shopping cart 24 and/or modify the contents by adding or removing items. User 10 may also share access to virtual shopping cart 24 with one or more other users. A user having shared access to virtual shopping cart 24 may be assigned privileges associated with the cart, such as the ability to view the contents of the cart, add comments to the cart, add or remove items from the cart, purchase one or more items in the cart, or any combination thereof. Items in each cart 24 are not purchased until user 10, or another user having shared access and purchase privileges, completes a checkout process, at which time the purchased items are removed from the cart.

Figure 2:
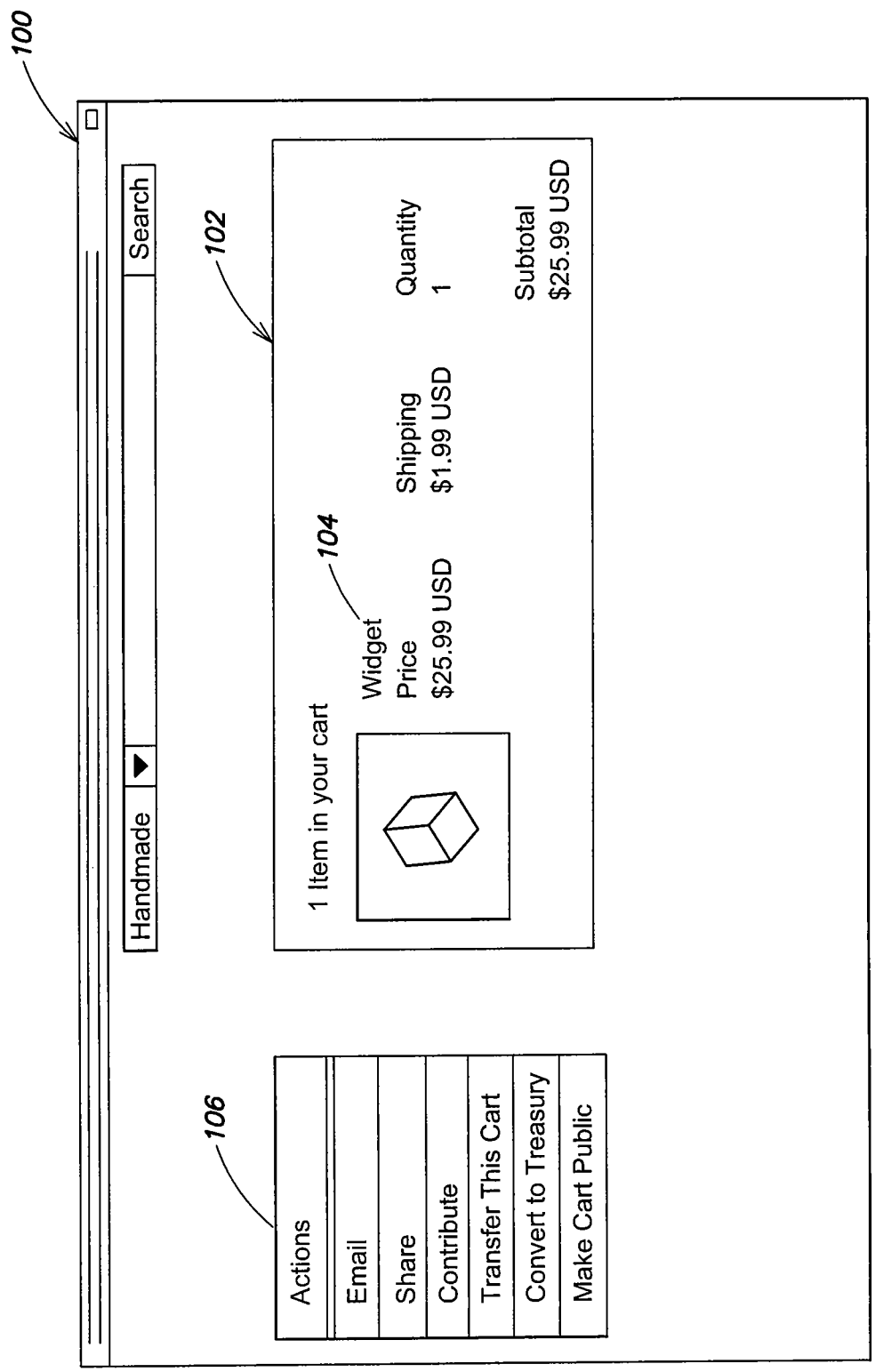
FIG. 2 illustrates a virtual shopping cart webpage having a virtual shopping cart in accordance with one embodiment of the present invention.

FIG. 2 illustrates a shopping cart webpage 100 for displaying a virtual shopping cart, an exemplary representation of which is indicated at 102, in accordance with one embodiment. Virtual shopping cart 102 includes one or more items 104 that have been selected by a user and placed into the cart. The items may be selected from a listing provided by the e-commerce website. Shopping cart webpage 100 may optionally contain additional information related to the items 104, such as quantity, price, availability, shipping costs, total price, and/or other relevant information. Shopping cart webpage 100 further includes one or more action selectors, which are generally indicated at 106. Action selectors 106 represent a plurality of functions that, when one is selected by the user (e.g., by using a mouse, keyboard, or other input device on a client computing system that is used to display the webpage), sends a request to the e-commerce platform to perform a corresponding action on virtual shopping cart 102. A non-limiting list of exemplary actions includes e-mailing a message to another user, sharing the shopping cart with another user, contributing funds toward the purchase of one or more items in the shopping cart, transferring the shopping cart to another user, converting the shopping cart to a curated list (also referred to herein as a "treasury", as discussed further below), and making the shopping cart public. These exemplary actions will be described in further detail below.

According to an embodiment, the shopping cart becomes shared with one or more other people when one or more of the action selectors 106 are selected. A "shared" shopping cart is, for example, a cart that may be viewed, manipulated, or otherwise controlled or accessed by a person other than the user who created the shopping cart (e.g., by selecting at least one item for prospective purchase within the e-commerce website). When shopping cart 102 is initially created by a user (e.g., by placing one or more items into the cart), only the user who created the cart may view, access, or otherwise manipulate the cart. In one respect, shopping cart 102 is subordinate to the user before it is shared with others. Shopping cart 102 becomes shared only after the user (or owner) of the cart expressly requests a sharing action be taken with respect to the cart, for example, one or more of the actions listed in action selector 106. In another example, a system may store predefined associations or relationships between particular users, and sharing actions may be automatically created responsive to these predefined relationships (e.g., a friend, family, or business relationship).

Figure 3:
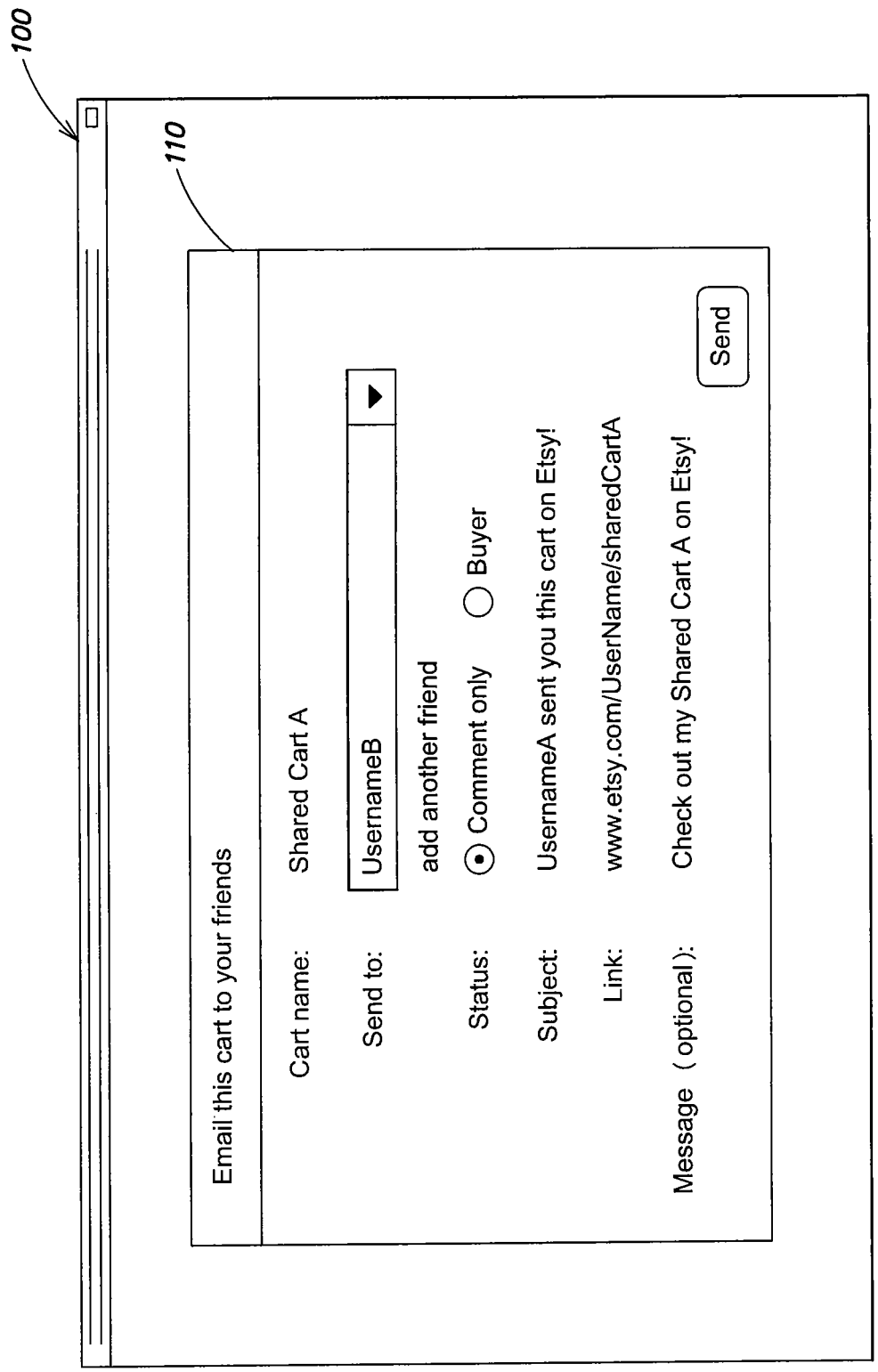
FIG. 3 illustrates the virtual shopping cart webpage of FIG. 2 having a configuration dialog box.

FIG. 3 illustrates the shopping cart webpage 100 having an e-mail configuration dialog box 110 that is displayed to the user when the user selects the "e-mail" action from the list of action selectors 106, as described above with respect to FIG. 2. It should be understood that the use of e-mail configuration dialog box 110 is merely exemplary, and that other techniques for configuring an e-mail message may be used, such as web pages or web forms. Within e-mail configuration dialog box 110, the user may enter a name for virtual shopping cart 102, enter the name or address of one or more recipients for the e-mail, select a status or privilege level of the recipient(s), enter a message subject, and enter a message (e.g., a text string). Other functions may be included, such as providing a link to virtual shopping cart 102, a link to one or more items, or other information. When the user has completed configuring the e-mail message using the e-mail configuration dialog box 110, the user may click on a send button to send an e-mail message to the one or more recipients. The shopping cart then becomes shared between the user who created the cart and the recipient(s) of the e-mail message. For example, the e-commerce platform may include a virtual shopping cart component that is configured to enable multiple users to access, view, and/or modify the contents of the shared shopping cart. The virtual shopping cart component may store, for example, a list of users and associated cart privileges (e.g., view, add, remove, and/or modify items in the cart) in a database. Further, the component may be configured to enable multiple users to communicate with one another (e.g., using electronic messages, social networking websites, or other communication tools). Each recipient of the e-mail message may view and/or manipulate the shared shopping cart, depending on a status or privilege level of the respective recipient, which is set by the user sharing the cart.

In one embodiment, the e-mail message may include a link, such as a Hypertext Transfer Protocol (HTTP) address that points to a webpage containing the shared shopping cart. The link may be generated automatically by the e-commerce platform. When the recipient of the e-mail message clicks on the link, the e-commerce website displays the shared shopping cart to the recipient within a webpage that is transmitted, for example, over a communications network (e.g., the Internet) to a client computer. The user may then view and modify the items of the shared shopping cart using a web browser on the client computer. The e-mail message may also include one or more other elements, such as the message subject and the message body (e.g., the contents of the message).

In one embodiment, the user may be permitted, by a control of the user interface, to configure the status or privilege level of each recipient. Setting the status enables the user to set permissions for the recipient to access the shared shopping cart (e.g., to view, modify, purchase, etc.). For example, the status of the recipient may be set to either "comment only" or "buyer." If the status is "comment only," the recipient will only be able to view the shared shopping cart and enter comments and/or ratings information that will be associated with the shared shopping cart, individual items in the cart, or a combination of these. The comments and ratings information may then be viewable by the user who created the shared cart and others who view the cart. If the status is "buyer," the recipient will be able to view the shared shopping cart, enter comments and/or ratings information that will be associated with the shared shopping cart, individual items in the cart, or a combination of these, and purchase the items in the cart. It should be appreciated that the above examples are intended to be non-limiting, and that other types of access permissions may be configured by the user for the status of each recipient of the e-mail message (e.g., modify cart, add items to cart only, remove items from cart only, purchase select items, and so forth). Further, it will be appreciated that the e-mail message may be any type or form of electronic communication, such as an instant message, a personal message, a text message, or a post to a social networking service (e.g., through an application program interface (API) provided by the social networking service, such as Facebook®, Twitter®, or Kaboodle®), in which the user provides information about the shared shopping cart to the recipient(s) of the communication.

Figure 4:
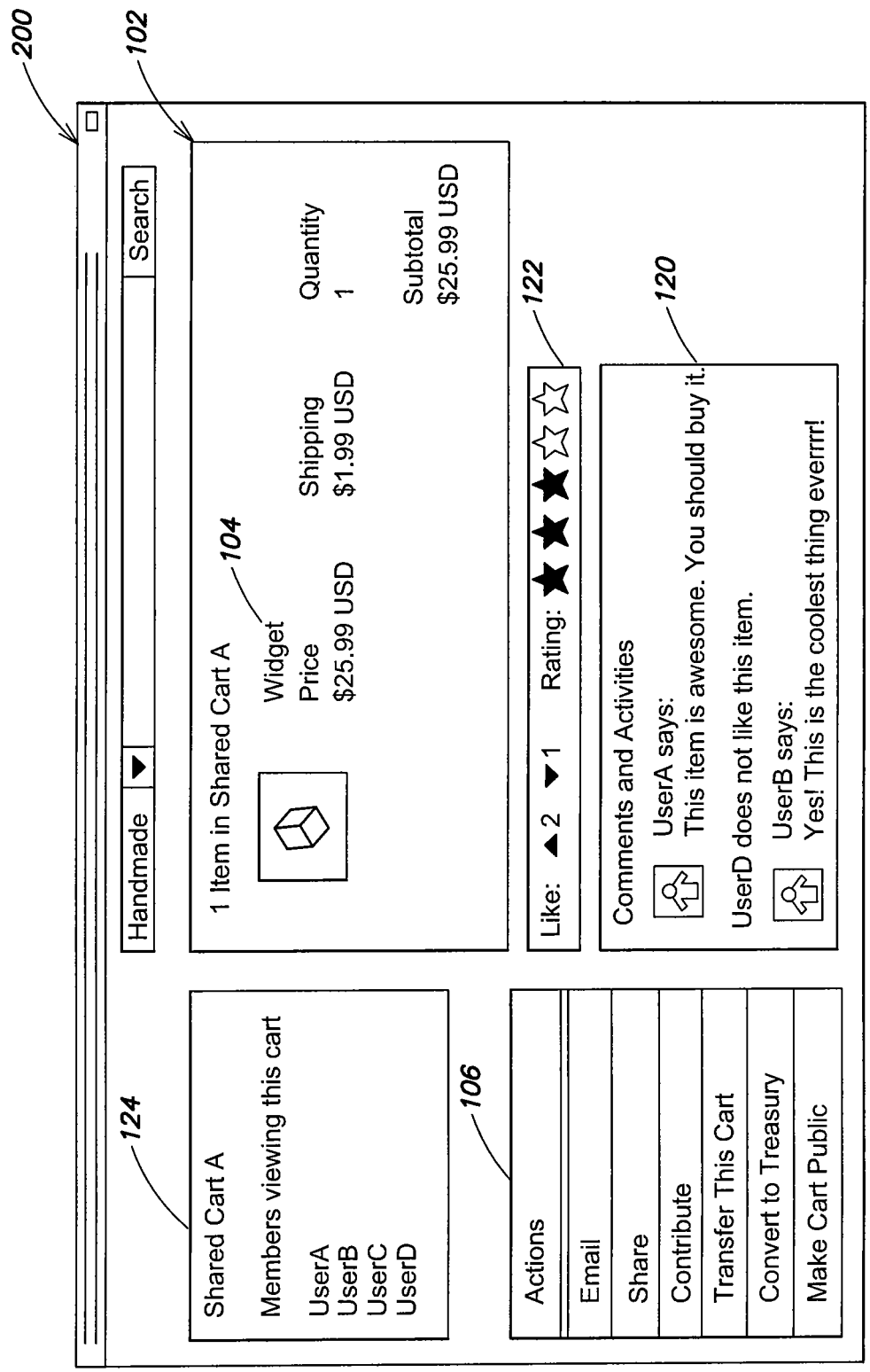
FIG. 4 illustrates a virtual shopping cart webpage having a display that shows comments and rating information in accordance with another embodiment of the present invention.

FIG. 4 illustrates another exemplary shopping cart webpage 200 containing virtual shopping cart 102 having a comment and ratings feature. Each virtual shopping cart 102, each item 104 in the cart, or both, have comments 120 and ratings 122 associated with them. Comments 120 may include a list of comments provided by each person having shared access to virtual shopping cart 102. For example, a user having access to virtual shopping cart 102 may enter a comment and/or a rating for the entire cart or for individual items contained in the cart. The comments may be provided by selecting a comment from a list of prepared comments, such as "I like this" or "I do not like this," or the comments may be customized by the person supplying the comment (e.g., by entering text). Ratings 122 may include, for example, a counter of how many people "like" or "dislike" the virtual shopping cart 102 and/or the items 104 therein. Ratings 122 may, for example, include a "star" rating device, wherein the rating is selected from, for example, zero to five stars, or other rating technique (e.g., "thumbs-up/thumbs-down," "like/dislike," and so forth).

As shown in FIG. 4, shopping cart webpage 200 includes shared shopping cart details 124. Shared shopping cart details 124 includes information related to virtual shopping cart 102 (e.g., information that describes the cart) after it has been shared. For example, shared shopping cart details 124 may include a list of users of the e-commerce website with whom the cart has been shared, users viewing the shared cart (e.g., in real time), or other details about the cart, such as the number of items in the cart or the total cost of all items in the cart.

Figure 5:
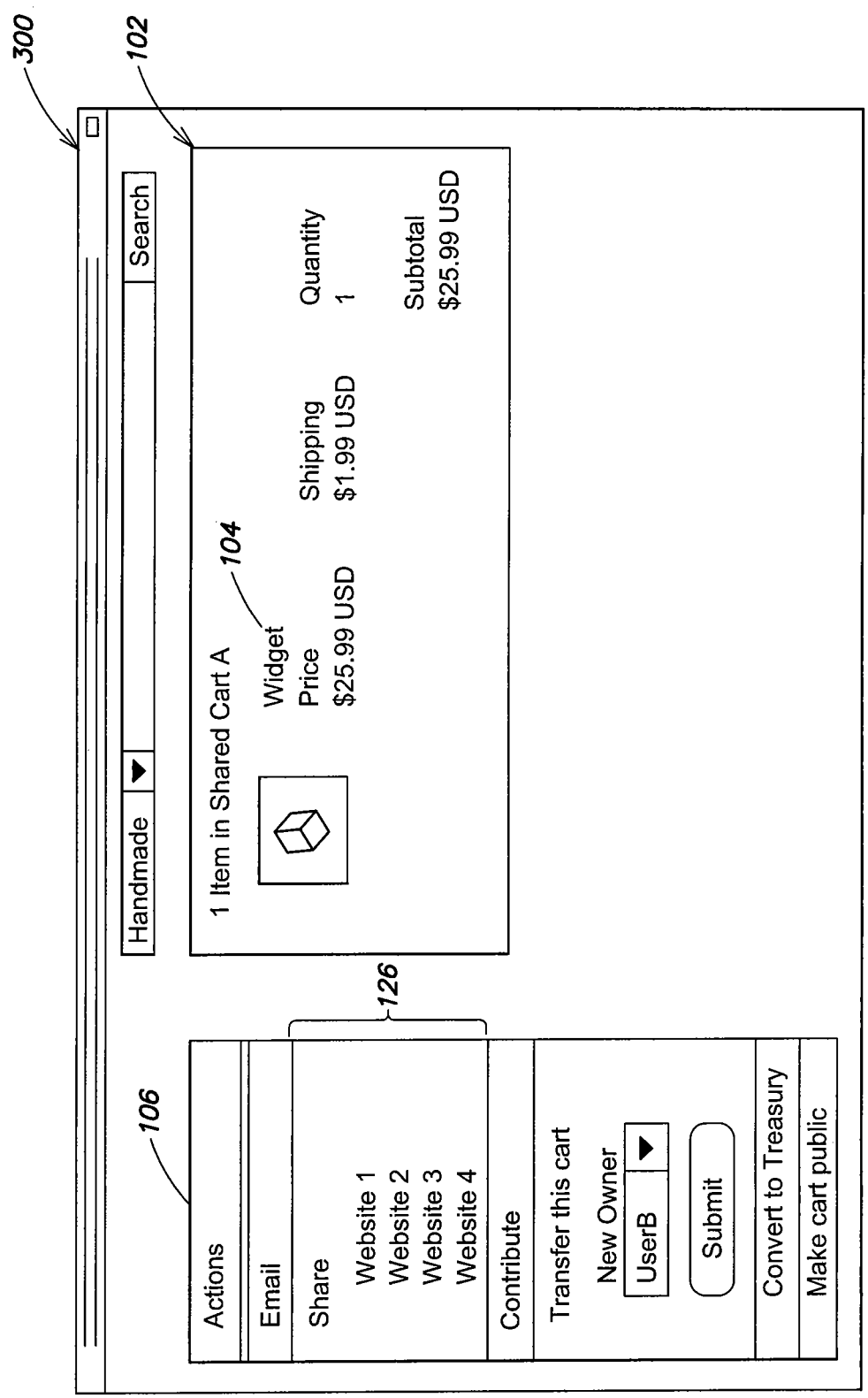
FIG. 5 illustrates a virtual shopping cart webpage in accordance with another embodiment of the present invention.

FIG. 5 illustrates a shopping cart webpage 300 in accordance with another embodiment. Shopping cart webpage 300 includes a sharing selector 126 that is displayed when the user selects "share" from action selectors 106. Sharing selector 126 includes representations of one or more different websites or web pages that the user may use to share shopping cart 102. Such different websites or web pages may include, for example, Facebook®, Twitter®, Kaboodle®, or other websites which support electronic communications between users. For example, if the user selects "Facebook," shopping cart 102 can be shared with one or more Facebook users, who may be the same person as the user, or other people. Further, optionally a message may be sent by the user to the Facebook user, for example, posting a message (e.g., through an API provided by Facebook) that includes a HTTP link to shopping cart 102 or other relevant information about the cart on the Facebook user's Facebook Wall, or other activity feed, message board, electronic mailbox, etc. It should be appreciated that similar functionality may be utilized with respect to each of the one or more different websites or web pages that are listed in sharing selector 126.

According to one embodiment, the user may share a virtual shopping cart with other people to enable them to contribute funds toward the purchase of one or more items in the cart. Funds contributed by others may represent the sum total of the price of each, any or all items in the cart, or a different amount. In a first example, User A may place an item in the cart that costs $9.99. User A may then share the cart with User B by selecting the "contribute" action within action selector 106, such as shown in FIG. 2, which invokes a commitment by User A to contribute funds toward the purchase of the item (e.g., funds amounting to all or part of the price of the item). If User B exercises the commitment of User A, User A will incur a charge in the amount previously committed to when User B purchases the item (e.g., by paying the balance of the price of the item). For example, User A may commit to pay $5.00 towards the purchase of the item. If User B exercises that commitment, and pays the balance of the price of the item (e.g., $4.99), the item will be purchased for a designated person (e.g., User B, User A, or another person to be designated by either User A or User B) using funds provided by Users A and B. More than one other user (e.g., User C) may contribute funds toward the purchase of the item.

In a second example, User A may place an item in the cart that costs $9.99. User A may then share the cart with User B. User B may elect to contribute funds toward the purchase of the item at any time. Other users with whom User A has shared the cart may also elect to contribute funds. At any time, User A may purchase the item by accepting User B's contribution (if any, or the contributions of other users, e.g., User C). If, for example, the sum of all contributions is less than the price of the item, User A may purchase the item by paying the balance of the price not covered by the contributions (or, if there are no contributions, the total price), and User B (and other users, e.g., User C) will be charged for the amount each has committed to contribute.

In a third example, User A may place one or more items in the cart that, in total, cost $200.00. User A may then share the cart publicly or semi-publicly (e.g., with many other people or a group of other people). One or more people (e.g., User A, others, or both) may then elect to contribute all or part of the cost of an individual item or group of items in the cart using, for example, a website coupled to the e-commerce platform. If and when the sum of all contributions to the cart equal or exceed the total (e.g., $200.00), the item is automatically purchased, and each person is charged for their contribution amount. It should be appreciated that the above described examples are intended to be non-limiting and merely exemplary of one or more embodiments of the present invention.

FIG. 6 illustrates the shopping cart webpage 100 having a contribution configuration dialog box 130 that is displayed to the user when the user selects the "contribute" action from the list of action selectors 106, such as shown in FIG. 2. It should be understood that the contribution configuration dialog box 130 is merely exemplary, and that other techniques for configuring a contribution may be used, such as other web pages or web forms. Contribution configuration dialog box 130 includes recipient information 132, shopping cart information 134, contributor selector 136, initial contribution information 138, and message information 140.

Recipient information 132 may include information related to the person with whom the shopping cart is shared or sent to, such as name, address, and other identifying information. Shopping cart information 134 includes, for example, a list of one or more items that are in the shopping cart (e.g., item 104 in shopping cart 102, such as shown in FIG. 2) and, optionally, the price, quantity, size, color, or other attribute or combination of attributes of each item in the cart. In one embodiment, contributor selector 136 includes an interface that enables the user to allow anyone to contribute funds towards the purchase of one or more items in the shopping cart, or to restrict such contributors to one or more specific people (e.g., a specific user of the e-commerce website). For example, the user may elect to allow anyone to view the shopping cart and commit to contribute funds towards purchasing one or more of the items in the cart, or the user may "invite" only selected people to view the cart and contribute. Message information 140 includes an interface that enables the user to create an optional message that is transmitted to one or more other people in conjunction with the shared shopping cart.

Figure 7:
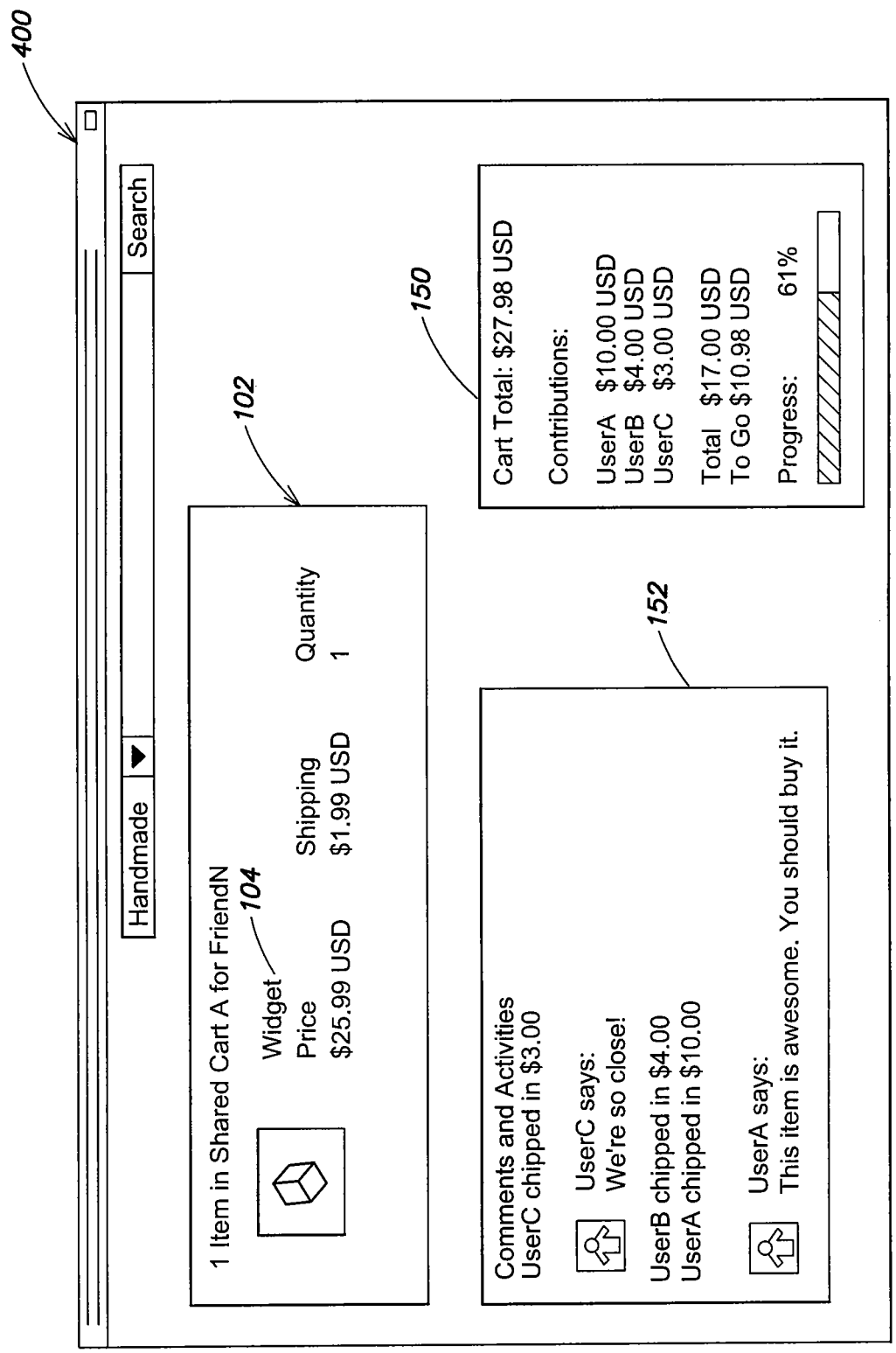
FIG. 7 illustrates a virtual shopping cart webpage in accordance with another embodiment of the present invention.

FIG. 7 illustrates yet another shopping cart webpage 400 in accordance with one embodiment. Shopping cart webpage 400 includes information related to virtual shopping cart 102, including one or more items 104. Shopping cart webpage 400 further includes contribution information 150, for example, a list of people who have committed to contribute funds toward the purchase of one or more items in virtual shopping cart 102 (e.g., item 104), a list of fund amounts each contributor has committed to paying, a total fund amount of all contributions, a balance amount representing at least the difference between the price of the items 104 and the fund amounts of each contributor, or any combination of this information. Contribution information 150 may optionally include other information related to the contributions, for example, a visual progress bar showing a percent value representing the total fund amount of all contributions relative to the total price of the item(s) 104.

Shopping cart webpage 400 may optionally include a comments field 152, which displays information related to virtual shopping cart 102, such as the contribution amount of each contributor, or other user-supplied comments.

According to another embodiment, the user may transfer the virtual shopping cart to another person. For example, User A may place one or more items into the cart, and then transfer ownership and/or control of the cart to User B (e.g., by selecting "Transfer" from action selector 106, such as shown in FIG. 2). Once control of the cart is transferred to User B, User B will be provided full access to the cart (e.g., User B will be able to add items to the cart, remove items from the cart, and purchase items in the cart). In another example, one or more items in the cart may be transferred by the e-commerce platform into another shopping cart created by User B.

In yet another embodiment, the e-commerce platform may permit the user to convert the virtual shopping cart into a curated list, or treasury, of items. A curated list is a listing of items that is customized and maintained by a user. The curated list may, optionally, have a theme or other unique identifying characteristic (e.g., a list of dress shirts, a list of Impressionistic art, and so forth). The curated list may be viewed by other users. For example, User A may place one or more items into the cart, and then convert the cart into a curated list (e.g., by selecting "Convert to Treasury" from action selector 106, such as shown in FIG. 2). Once the cart has been converted into the curated list, the cart ceases to exist. Items that were previously in the cart will now be displayed as part of the curated list, which other users may view and select items from (e.g., for purchase).

Shopping Cart Statistics

According to another embodiment, the e-commerce platform provides, to one or more users, information related to the virtual shopping carts of one or more users. The information includes statistical data associated with any of the items contained by the virtual shopping carts, such as a quantity of a particular item available for sale, a number of unique shopping carts containing the particular item, identifying information of the user or users having the particular item in their carts, or any combination of these data. Other examples will now be described with respect to the drawings.

Figure 8:
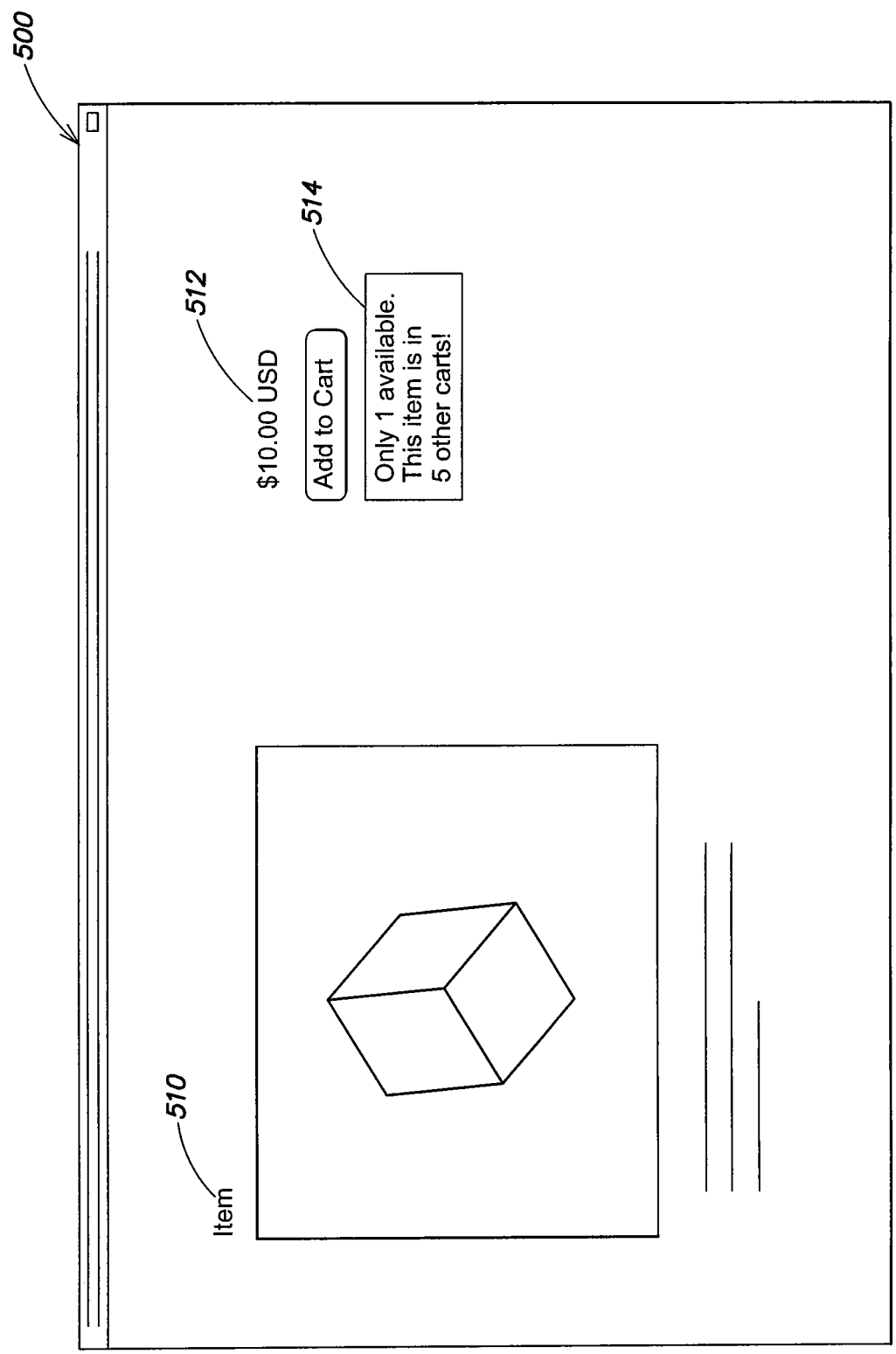
FIG. 8 illustrates a virtual shopping cart webpage in accordance with another embodiment of the present invention.

FIG. 8 illustrates a shopping cart webpage 500 having virtual shopping cart statistics, according to one embodiment. Shopping cart webpage 500 includes an item description 510, an item price 512, and an item statistics panel 514. Item statistics panel 514 includes, for example, information indicating how many units of the item are available for purchase and how many units of the item are currently in other shopping carts (e.g., shopping carts of other users). Item statistics panel 514 may include text, graphics, or both. It should be appreciated that the information provided in item statistics panel 514 may be provided in other ways, such as within an e-mail message, a text message, a personal message, a message sent to a social networking website (e.g., Facebook, Twitter, and so forth), or within an analytical report that may be provided to other users (e.g., the seller of the item). The information provided in item statistics panel 514 may be useful to the user in a number of ways. For example, by knowing how many units of an item are available, and how many other users have the same item in their shopping carts, a buyer may be able to gauge the overall degree of interest in the item and make a purchasing decision using that knowledge. In another example, the seller of the item may be able to use the information for marketing purposes, for example, to encourage a user to purchase the item due to high demand by other users, low or limited availability, price, or other considerations.

It is appreciated that conventional shopping cart implementations do not provide information relating to other users' carts that may be helpful in performing a transaction. For example, a seller may use statistical data regarding item selection and/or sales to advertise or otherwise market related items to users (e.g., advertising a hat to a user who purchased a jacket based on statistical data showing that 50% of user purchasing the jacket also purchased the hat).

Figure 9:
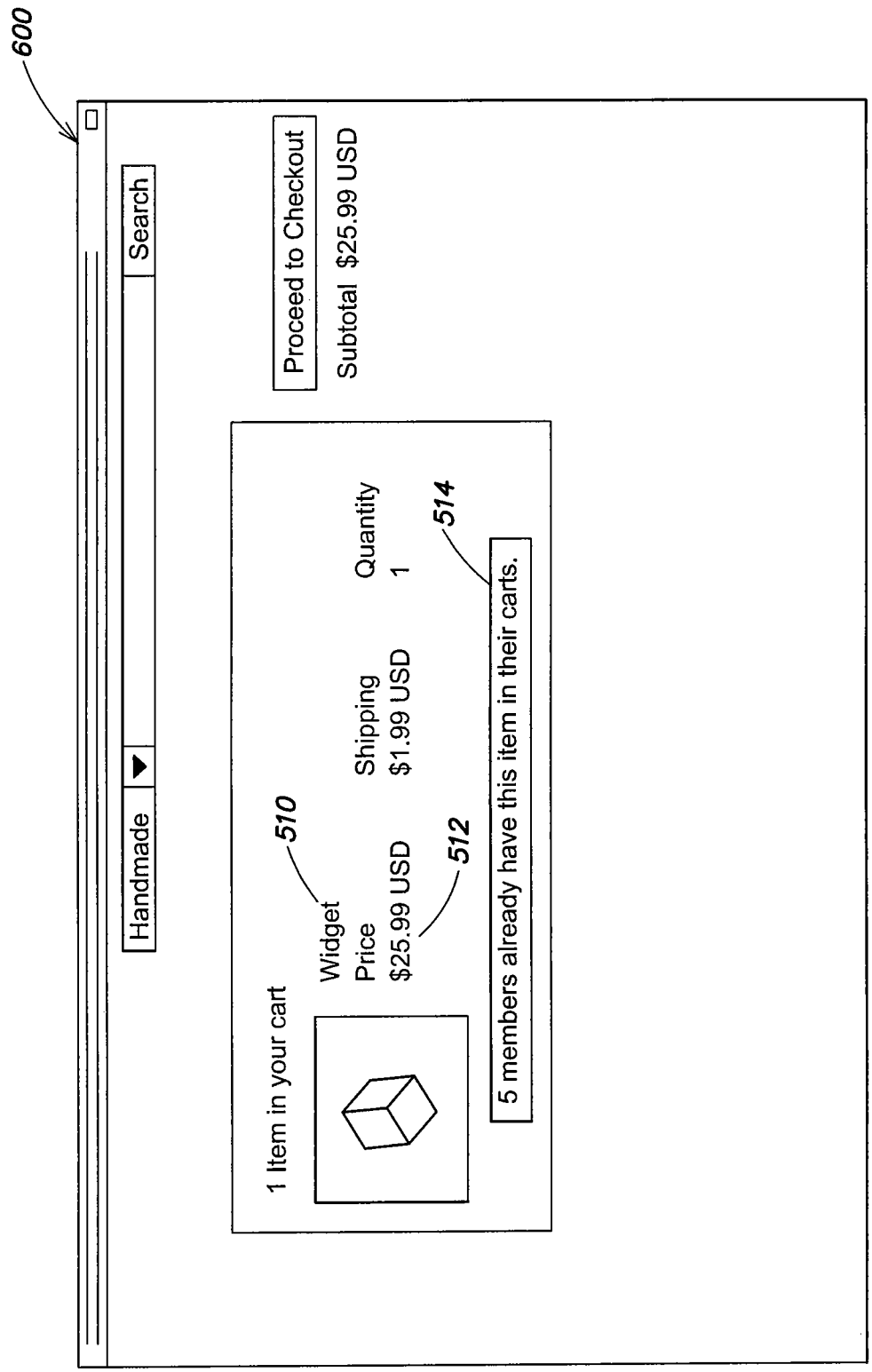
FIG. 9 illustrates a virtual shopping cart webpage in accordance with another embodiment of the present invention.

FIG. 9 illustrates another shopping cart webpage 600 having virtual shopping cart statistics, according to one embodiment. Shopping cart webpage 600 includes the item description 510, the item price 512, and the item statistics panel 514, such as described above with reference to FIG. 8. Shopping cart webpage 600 represents an exemplary view of the "checkout" process within the e-commerce system.

Figure 10:
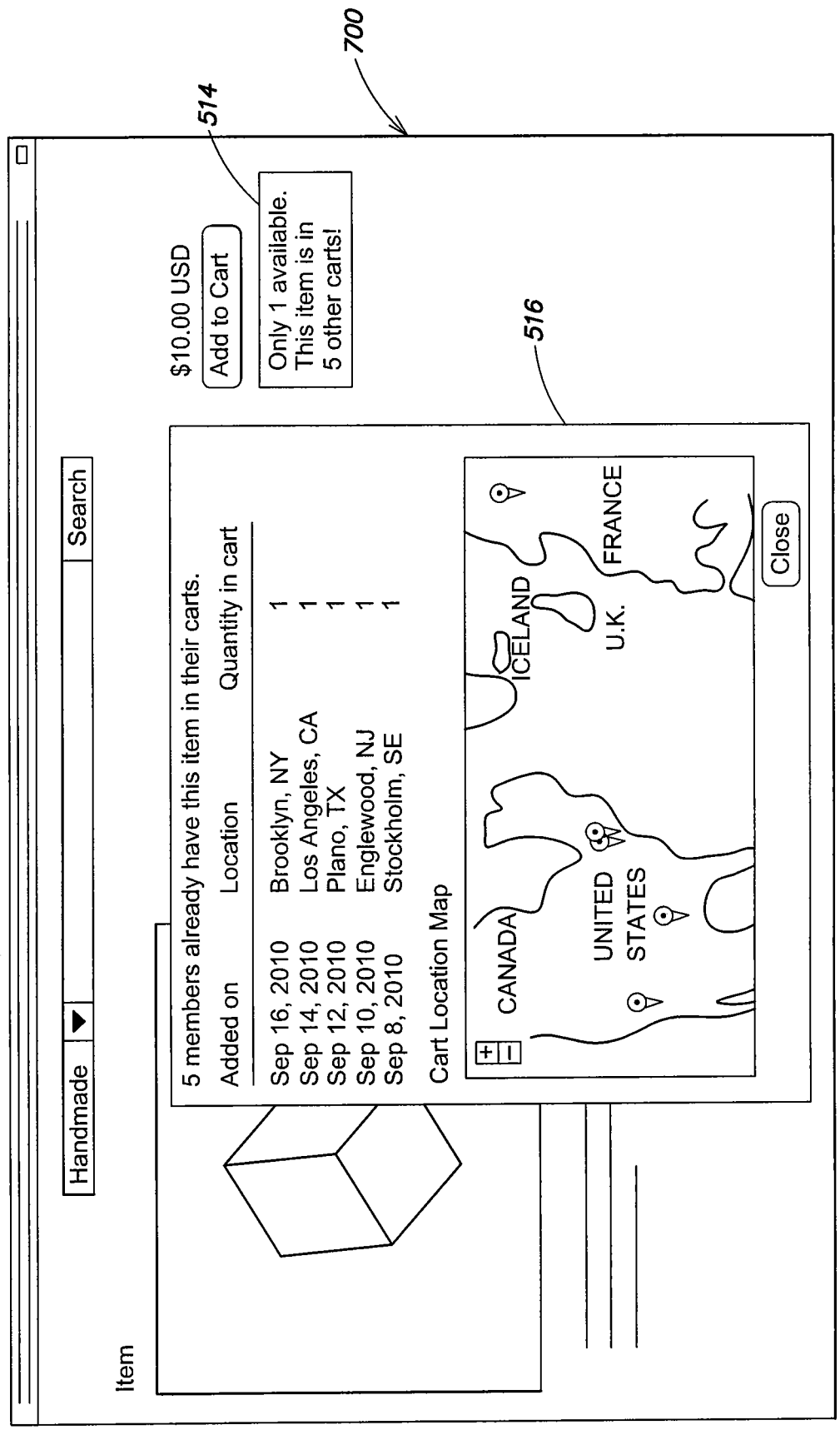
FIG. 10 illustrates a virtual shopping cart webpage in accordance with another embodiment of the present invention.

FIG. 10 illustrates another shopping cart webpage 700 having virtual shopping cart statistics, according to one embodiment. Shopping cart webpage 700 includes item statistics panel 514 and item statistics detail panel 516. Item statistics panel 514 includes, for example, information indicating how many units of the item are available for purchase and how many units of the item are currently in other shopping carts (e.g., shopping carts of other users). Item statistics detail panel 516 includes additional information, for example, for each user who has the item in their shopping cart, the date the item was added to the respective cart, the location of the user, and the quantity of the item in each cart. Item statistics detail panel 516 may include a map graphically representing the location of each user who has the item in their respective cart.

Figure 11:
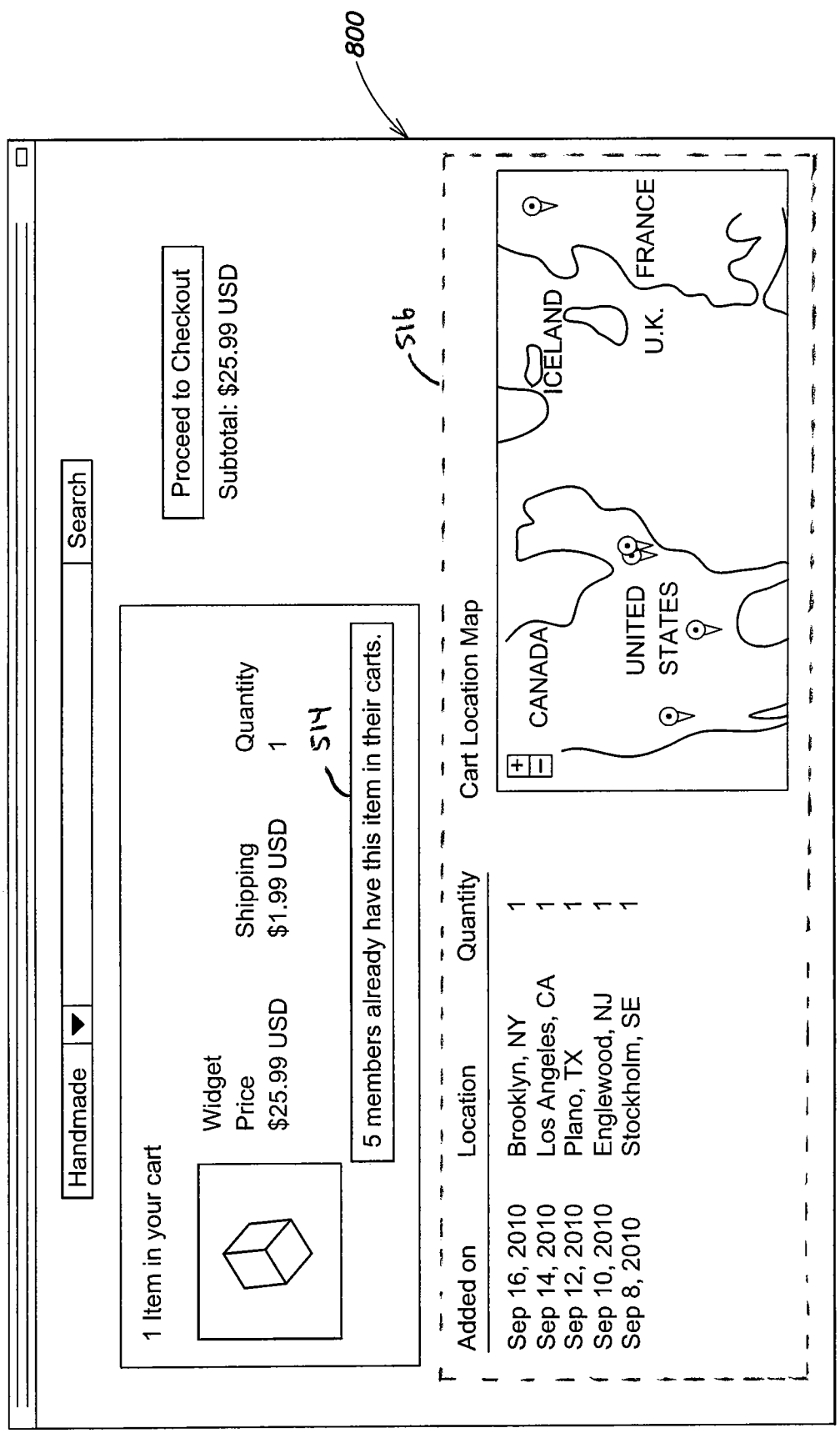
FIG. 11 illustrates a virtual shopping cart webpage in accordance with another embodiment of the present invention.

FIG. 11 illustrates another shopping cart webpage 800 having virtual shopping cart statistics, according to one embodiment. Shopping cart webpage 800 includes the item statistics panel 514 and item statistics detail panel 516, such as described above with reference to FIG. 10. Shopping cart webpage 800 represents an exemplary view of the "checkout" process within the e-commerce system.

Figure 12:
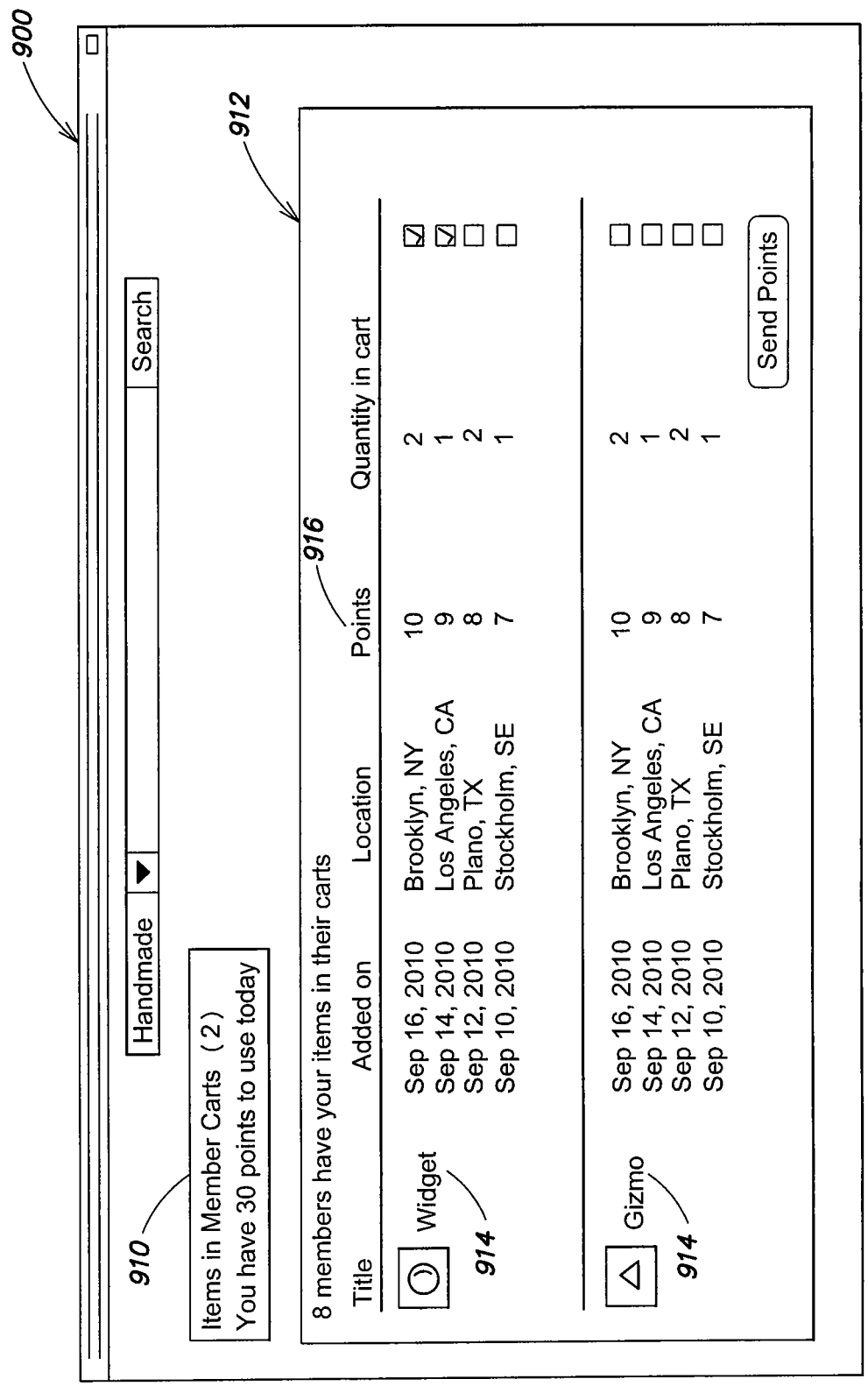
FIG. 12 illustrates a virtual shopping cart webpage in accordance with another embodiment of the present invention.

FIG. 12 illustrates a shopping cart webpage 900 having virtual shopping cart statistics, according to another embodiment. Shopping cart webpage 900 includes an item statistics panel 910 and item statistics detail panel 912. Shopping cart webpage 900 may, for example, be provided to a seller of one or more items that are each in a virtual shopping cart of one or more other users of the e-commerce website. The seller may use the information provided by shopping cart webpage 900 to identify, for example, which items are in at least one other user's virtual shopping cart, how many units of each item are in one or more carts, and the location of each user who has at least one item in their cart. The identity of each user having at least one of the seller's items in their cart may be confidential and not provided to the seller unless, for example, the user grants permission to share such personally identifiable information with the seller.

In one embodiment, the e-commerce platform provides the seller with an ability to incentivize one or more users to purchase items listed on the website by the seller. For example, the incentives may include a direct marking incentive whereby the seller offers to one or more users an opportunity to purchase one or more items in conjunction with a special offer. The special offer may include, by way of non-limiting examples, a discount on price, a discount on shipping fees, free items, free shipping, a "two-for-one" deal, a credit towards a future purchase, or other marketing incentive. For instance, a promotion system is established wherein the seller is allocated points which may be used (consumed) towards incentivizing one or more users who have one or more of the seller's items in their respective virtual shopping carts to purchase the item(s). The total number of points available for the seller to use is displayed within item statistics panel 910, as shown in FIG. 12. The points may be allocated on, for example, a daily, weekly, monthly, quarterly, or other basis. In one aspect, the total number of points is considered a "point budget" from which the seller may draw for use within the promotional system. Each point within the point budget represents an opportunity, or a portion of an opportunity, for the seller to extend the direct marketing incentive to another user, in particular, users who are likely to purchase an item based on, for example, their past purchase history, their location, and/or the item or items in their respective carts, among other factors. The point budget may be allocated to the seller based on a number of factors, such as the seller's sales volume, number of items listed for sale on the e-commerce website, the seller's tenure as a member of the website, or other considerations.

In a first example, the seller has been allocated 30 points for daily use in the promotion system, as indicated in item statistics panel 910 and shown in FIG. 12. Users in Brooklyn, N.Y., Los Angeles, Calif., Plano, Tex., and Stockholm, SE have both of seller's items 914 in their respective carts. Associated with each user are point costs, indicated at 916, being 10, 9, 8 and 7 points, respectively. The point costs 916 are determined by the e-commerce system. Thus, the seller may extend a marketing incentive to the user in Brooklyn, N.Y. by using 10 points, and another marketing incentive to Los Angeles, Calif. using 9 points of the seller's point budget. The seller may extend marketing incentives to any one of the users, or any combination of users, as long as the seller has a sufficient number of points within the point budget to do so. The marketing incentive may be extended to the user using, for example, e-mail, direct messaging (e.g., a message within the virtual shopping cart or a message sent to the user's account within the e-commerce website), or other communication method. The marking incentive may have a limited life span, for example, an offer that is only valid for a limited period of time, or an unlimited life span.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A method of shopping within an electronic commerce environment, the method comprising acts of:
    enabling a first user of a plurality of users of the electronic commerce environment to add one or more items to a virtual shopping cart of the first user that is maintained by a server computer system;
    generating, by the server computer system, statistical data related to the one or more items, the statistical data including a non-zero sum total quantity of at least one of the one or more items that are contained in virtual shopping carts of the plurality of users of the electronic commerce environment other than the first user; and
    providing the statistical data including the non-zero sum total quantity of the at least one of the one or more items that are contained in the virtual shopping carts of the plurality of users of the electronic commerce environment other than the first user to the first user in a single web page that is generated by the server computer system.

2. The method of claim 1, wherein the statistical data further includes a location of at least one of the plurality of users of the electronic commerce environment other than the first user having the at least one of the one or more items in their virtual shopping carts.

3. The method of claim 2, wherein the location is graphically represented on a map that is generated by the server computer system and presented to the first user in the web page.

4. The method of claim 1, wherein the statistical data further includes a quantity of each of the one or more items which are available for purchase.

5. The method of claim 1, wherein the statistical data further includes a date on which the at least one of the one or more items was added to the virtual shopping cart of at least one of the plurality of users of the electronic commerce environment other than the first user.

6. The method of claim 1, further comprising enabling a seller of the at least one of the one or more items to send a sales incentive to the first user.

7. The method of claim 6, wherein sending the sales incentive to the first user consumes a pre-determined number of points that are allocated to the seller, the predetermined number of points based on at least one of a characteristic of the seller, the first user and the statistical data.

8. The method of claim 7, wherein the characteristic of the first user includes at least one of a purchase history of the first user, a location of the first user, a length of time that the first user has been a member of the electronic commerce environment, and the one or more items in the virtual shopping cart of the first user.

9. The method of claim 7, wherein the characteristic of the seller includes at least one of a sales volume of the seller within the electronic commerce environment, a sales history of the seller, and a length of time that the seller has been a member of the electronic commerce environment.

10. The method of claim 6, wherein the sales incentive includes at least one of a price discount offer, a shipping cost discount offer, a free item offer, a free shipping offer, a two-for-one offer, and a credit offer.

11. An electronic commerce system, comprising:
    a computer server comprising:
        a virtual shopping cart component configured to enable a first user of a plurality of users of the electronic commerce system to add one or more items to a virtual shopping cart of the first user; and
        a statistical data component configured to:
            generate statistical data related to the one or more items, the statistical data including a non-zero sum total quantity of at least one of the one or more items that are contained in virtual shopping carts of the plurality of users of the electronic commerce system other than the first user; and
            provide the statistical data to the first user in a single web page that is generated by the electronic commerce system.

12. The system of claim 11, wherein the statistical data further includes a location of at least one of the plurality of users of the electronic commerce system other than the first user having the at least one of the one or more items in their virtual shopping carts.

13. The system of claim 12, wherein the location is graphically represented on a map that is presented to the first user in the web page.

14. The system of claim 11, wherein the statistical data further includes a quantity of each of the one or more items which are available for purchase.

15. The system of claim 11, wherein the statistical data further includes a date on which the at least one of one or more items was added to the virtual shopping cart of at least one of the plurality of users of the electronic commerce system other than the first user.

16. The system of claim 11, wherein statistical data component is further configured to enable a seller of the at least one of the one or more items to send a sales incentive to the first user.

17. The system of claim 16, wherein sending the sales incentive to the first user consumes a pre-determined number of points that are allocated to the seller, the pre-determined number of points based on at least one of a characteristic of the seller, the first user and the statistical data.

18. The method of claim 17, wherein the characteristic of the first user includes at least one of a purchase history of the first user, a location of the first user, a length of time that the first user has been a member of the electronic commerce environment, and the one or more items in the virtual shopping cart of the first user.

19. The method of claim 17, wherein the characteristic of the seller includes at least one of a sales volume of the seller within the electronic commerce environment, a sales history of the seller, and a length of time that the seller has been a member of the electronic commerce environment.

20. The method of claim 16, wherein the sales incentive includes at least one of a price discount offer, a shipping cost discount offer, a free item offer, a free shipping offer, a two-for-one offer, and a credit offer.

21. A non-transitory computer readable medium having computer-executable instructions stored thereon for shopping within an electronic commerce website, the computer-executable instructions when executed by a computer causing the computer to perform a method comprising acts of:

enabling a first user of a plurality of users of the electronic commerce website to add one or more items to a virtual shopping cart of the first user that is maintained by a server computer system;

generating, by the server computer system, statistical data related to the one or more items, the statistical data including a non-zero sum total quantity of at least one of the one or more items that are contained in virtual shopping carts of the plurality of users of the electronic commerce website other than the first user; and providing the statistical data to the first user of the electronic commerce website in a single web page that is generated by the server computer system.

* * * * *

UNITED STATES PATENT AND TRADEMARK OFFICE
CERTIFICATE OF CORRECTION

PATENT NO. : 10,650,399 B2
APPLICATION NO. : 13/015622
DATED : May 12, 2020
INVENTOR(S) : Robert Kalin It is certified that error appears in the above-identified patent and that said Letters Patent is hereby corrected as shown below:

In the Claims

Claim 18: In Column 19, Line 7, delete "method" and insert -- system --, therefor.

Claim 19: In Column 19, Line 13, delete "method" and insert -- system --, therefor.

Claim 20: In Column 19, Line 18, delete "method" and insert -- system --, therefor.

Signed and Sealed this
Fourteenth Day of July, 2020

Andrei Iancu
*Director of the United States Patent and Trademark Office*